F. O. BOSWELL.
AUTOMOBILE LOCK.
APPLICATION FILED JULY 13, 1917.

1,265,732.

Patented May 14, 1918.
2 SHEETS—SHEET 1.

INVENTOR
Fletcher O. Boswell
By W. W. Williamson
Atty.

F. O. BOSWELL.
AUTOMOBILE LOCK.
APPLICATION FILED JULY 13, 1917.
1,265,732.
Patented May 14, 1918.
2 SHEETS—SHEET 2.
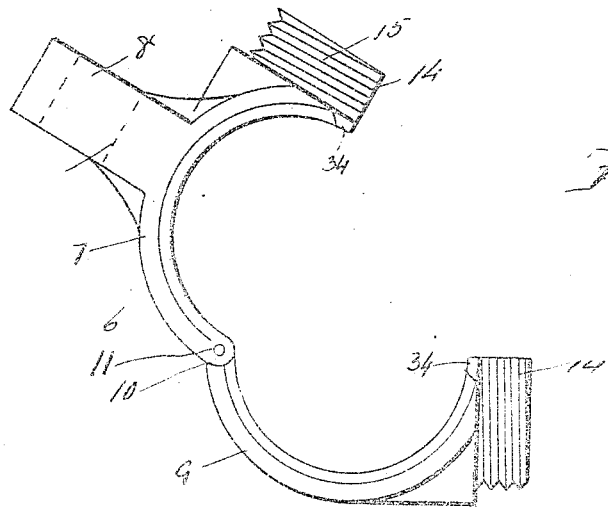
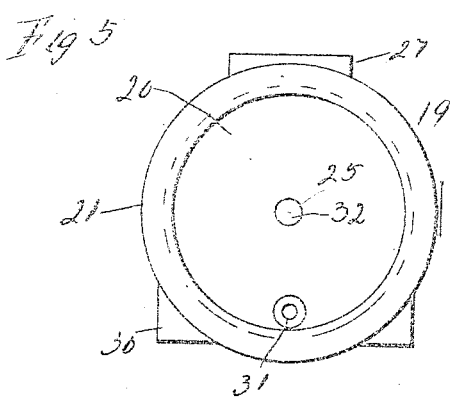
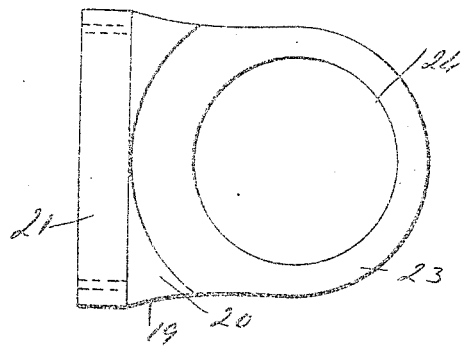
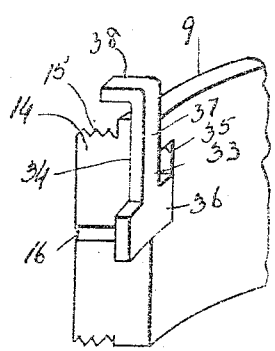
INVENTOR
Fletcher O. Boswell
By W. W. Williamson
Atty.

UNITED STATES PATENT OFFICE.

FLETCHER O. BOSWELL, OF PHILADELPHIA, PENNSYLVANIA.

AUTOMOBILE-LOCK.

1,265,732.

Specification of Letters Patent. Patented May 14, 1918.

Application filed July 13, 1917. Serial No. 180,265.

*To all whom it may concern:*

Be it known that I, FLETCHER O. BOSWELL, a citizen of the United States, residing at Philadelphia, in the county of Philadelphia and State of Pennsylvania, have invented new and useful Improvements in Automobile-Locks, of which the following is a specification.

My invention relates to new and useful improvements in automobile locks, and has for its object to provide a device of this character which is exceedingly simple in construction relatively small and compact, although strong and durable, and is adapted to be applied to the steering post whereby the same may be locked against rotation to prevent the unauthorized use of the automobile.

A further object of the invention is to provide an automobile lock which may be readily and quickly applied and in which the locking bolt is actuated by a combination lock so that only the person knowing the combination is enabled to unlock the steering gear so that the automobile may be used.

Another object of the invention is to provide a clamp adapted to be placed about the casing or sleeve of the steering post and located in position by a lock supporting member having threaded engagement with the clamp, said clamp being provided with a lug adapted to be attached to a suitable bracket fastened to some suitable portion of the automobile, such as the dash board thereof.

With these ends in view, this invention consists in the details of construction and combination of elements hereinafter set forth and then specifically designated by the claims.

In order that those skilled in the art to which this invention appertains may understand how to make and use the same, I will describe its construction in detail referring by numerals to the accompanying drawings forming a part of this application in which—

Fig. 4, is an end view of the clamp showing it in an open position.

Fig. 5, is an inner face view of the lock supporting member removed from the clamp.

Fig. 6, is a side elevation thereof with the lock removed, and

Fig. 7, is a fragmentary perspective view of the clamp showing the lock bolt holding key therein.

Figure 1:
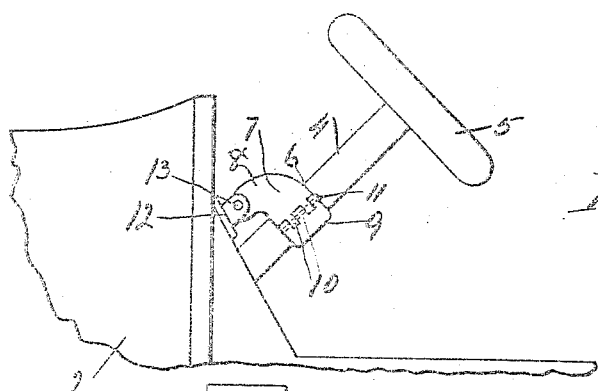
Figure 1, is a fragmentary side elevation of an automobile showing the steering post with my improved lock attached thereto.
Figure 2:
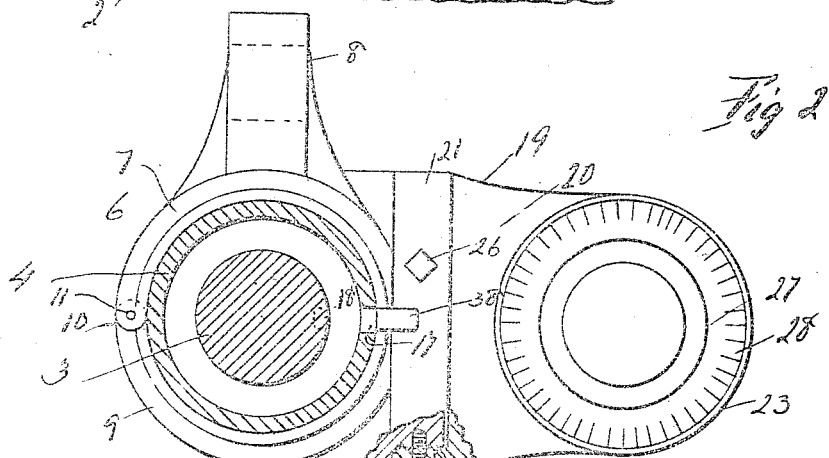
Fig. 2, is an enlarged end view of the automobile lock, portions thereof being broken away to clearly illustrate the construction with the steering post shown in section.

In carrying out my invention as here embodied, 2 represents an automobile or other self-propelled vehicle provided with a steering gear including steering post 3, the outer casing or sleeve 4, and the steering wheel 5.

About the casing 4 at some convenient point intermediate its length is placed the clamp 6 consisting of two members hinged together, and these members will be termed the stationary member 7 carrying a lug 8, and the hinged member 9, said members being provided with coacting hinge leaves 10 which overlap one another and have a pintle 11 passing therethrough. The lug 8 is pivoted at its outer end to a bracket 12 of any suitable construction by means of the headed pin 13, said bracket being fastened to some suitable portion of the automobile as the dashboard thereof. Each of the clamp members is provided at their free meeting edges or at the side opposite the hinge with a semicircular lug 14, each provided on its arcuate surface with threads 15, so that when the clamp members are closed, a complete circular lug is produced having external peripheral threads as will be obvious, and through these lugs is formed a bolt channel 16 adapted to aline with a bolt opening 17 in the steering post casing 4, and also with a bolt notch 18 formed in the steering post 3 when said steering post is at rest or in a position to be locked.

The reference numeral 19 designates the lock supporting member consisting of the body 20 having a flange 21 provided with internal threads 22, and a lock housing 23 having a lock opening or chamber 24 from which runs a bolt opening 25 through the body of the lock supporting member, which opening is adapted to aline with the channel 16 when said lock supporting member is properly positioned.

The lock supporting member is screwed on to the threaded lugs 14 of the clamp after the latter has been placed about the steering post casing, and when in the proper position, the lock supporting member is held against accidental displacement by suitable retaining means, such as set screws 26 which are threaded through the flange 21, so that their inner ends engage the lugs.

Figure 3:
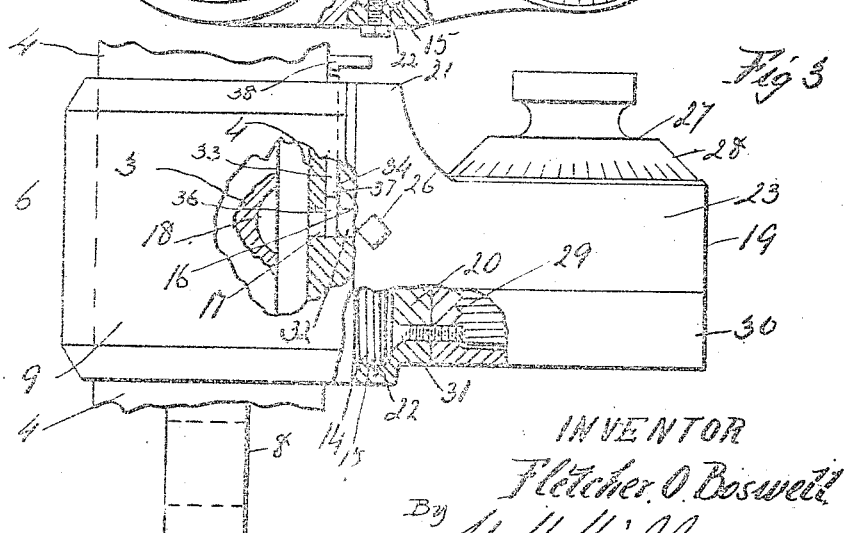
Fig. 3, is a side elevation thereof, portions being broken away to show the interior details of construction.

In the lock chamber 24 is mounted the combination lock 27 of any ordinary and well known construction, so that the flange 28 carrying the combination numbers engages one face of the lock housing 23, while the opposite end of the combination lock projects beyond the other face of the lock housing, and this projecting end is provided with external threads 29 on which is threaded a cap 30 so as to engage the other face of the lock housing and prevent the withdrawal of the combination lock, and this cap is prevented from accidental or unauthorized removal by means of a suitable fastening device, such as a screw 31, which is threaded through the body of the lock supporting member and through the cap and into engagement with the lock as plainly shown in Fig. 3. The lock bolt 32 when moved into locking position by the combination mechanism of the combination lock passes through the opening 25 in the lock supporting member through the channels 16 in the lugs of the clamp, then through the hole 17 in the casing of the steering post until the nose of said lock bolt registers with the notch 18 in the steering post which will effectually lock the steering post against rotation.

The lock bolt 32 is positively held in its unlocked position by a bolt holding key 33 slidably mounted in the keyway 34 in the clamp, said keyway being produced by forming a groove in the free meeting edge of both clamp members and each groove has an undercut edge with which coact the beveled edges of the bolt holding key.

Each groove is of two different widths, the wider portion being at the lower or inner end thereby forming shoulders 35 which act as a stop for the key, said key comprising a body 36, an integral shank 37 of less width than the body and a stem 38 projecting from the shank whereby the key may be moved inward or outward within the keyway.

When the lock bolt is moved into its unlocked position the key is moved inward across the path of travel of the lock bolt and prevents said lock bolt from engaging the steering post, which might be caused by the travel of the vehicle over an uneven road bed and which, if the bolt were not securely held in its unlocked position, might cause an accident by preventing the proper actuation of the steering gear.

In practice, the clamp 6 is loosely placed about the steering post or the casing thereof and properly positioned, after which the lug 8 carried thereby may be pivotally attached to the bracket 12 which is fastened in a suitable position to the desired part of the automobile. The clamp members are then brought together and the lock supporting member screwed on to the lug formed by the meeting of the two semi-circular lugs 14, at which time the parts are in position for use. By moving the steering wheel to the predetermined position so that the notch 18 therein alines with the lock bolt, then the combination lock is actuated in the ordinary manner, and the lock bolt caused to engage the notch 18, thereby effectively locking the steering gear, so that the automobile may not be used. Anyone knowing the proper combination of the combination lock, such as the owner of the automobile or trusted persons, can actuate the lock in the ordinary manner and cause the lock bolt to be withdrawn from the notch 18 in the steering post at which time the steering gear may be operated, and when the lock bolt has been withdrawn, the key 33 is moved inward until the body thereof lies across the path of travel of the lock bolt which will prevent the accidental movement of said lock bolt caused by jarring of the vehicle due to shocks received from obstructions upon the roadway.

From the foregoing, it will be seen that a very simple automobile lock is provided which may be readily and quickly applied to differently constructed automobiles, so long as some portion of the steering gear is rotatable during the steering operations and as the combination of locks of the character herein described can be changed, a different combination can be provided each time the automobile changes hands or when it becomes necessary to employ a different chauffeur, so that the previous chauffeur will be unable to operate the automobile should he desire to do so after leaving the employ of the owner of the automobile provided with my improved automobile lock.

Of course, I do not wish to be limited to the exact details of construction as herein shown as these may be varied within the limits of the appended claims without departing from the spirit of my invention.

Having thus fully described my invention, what I claim as new and patentable is—

1. In combination, a vehicle having a steering post provided with a notch, a casing surrounding said post, said casing having a hole in alinement with the notch, a clamp comprising two hinged members, a semi-circular lug at the free meeting edge of each member having threads on its arcuate portion, said members having channels therein, in the region of the semi-circular lugs, said channels alining with the hole in the casing, and a pivoting lug projecting from one of said members, a bracket carried by the vehicle to which the clamp is pivoted by means of the last named lug, a lock support having threaded engagement with the semi-circular lugs for holding the clamp closed, and a combination lock carried by the lock support, the bolt of said lock registering with the channels, the hole in the casing and the notch in the steering post for locking the latter.

2. In combination, a vehicle having a steering post provided with a notch, a clamp comprising two hinged members, a semi-circular lug at the free meeting edge of each member, said members having a channel therein in the region of the semi-circular lugs, said channels alining with the notch in the steering post and a pivoting lug projecting from one of said members, a bracket carried by the vehicle to which the clamp is pivoted by means of the last named lug, a lock support surrounding the semi-circular lugs for holding the clamp closed and a lock carried by the lock support, the bolt of said lock registering with the channels and the notch in the steering post for locking the latter.

3. In combination, a vehicle having a steering post provided with a notch, a clamp comprising two hinged members, a semi-circular lug at the free meeting edge of each member, said members having channels therein in the region of the semi-circular lugs, said channels alining with the notch in the steering post and a pivoting lug projecting from one of said members, a bracket carried by the vehicle to which the clamp is pivoted by means of the last named lug, a lock support surrounding the semi-circular lugs for holding the clamp in a closed position, said lock support having a bolt opening therein communicating with the channels in the clamp members, a lock carried by the lock support, said lock being provided with a lock bolt adapted to register with the bolt opening in the lock support, the channels in the clamp members and the notch in the steering post for locking the latter and a key slidably mounted in the clamp and adapted to lie across the path of travel of the lock bolt when the latter is withdrawn from the notch in the steering post.

In testimony whereof, I have hereunto affixed my signature.

FLETCHER O. BOSWELL.